US012428034B2

(12) United States Patent
Schmidt et al.

(10) Patent No.: US 12,428,034 B2
(45) Date of Patent: *Sep. 30, 2025

(54) METHOD FOR CLASSIFYING A BEHAVIOR OF A ROAD USER AND METHOD FOR CONTROLLING AN EGO VEHICLE

(71) Applicant: Robert Bosch GmbH, Stuttgart (DE)

(72) Inventors: Andreas Schmidt, Stuttgart (DE); Koba Natroshvili, Waldbronn (DE); Maxim Dolgov, Renningen (DE); Steffen Knoop, Hohenwettersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

This patent is subject to a terminal disclaimer.

(21) Appl. No.: 18/313,843

(22) Filed: May 8, 2023

(65) Prior Publication Data
US 2023/0399027 A1     Dec. 14, 2023

(30) Foreign Application Priority Data
May 23, 2022   (DE) ............... 10 2022 205 120.3

(51) Int. Cl.
*B60W 40/09*        (2012.01)
*B60W 60/00*        (2020.01)
(Continued)

(52) U.S. Cl.
CPC .... *B60W 60/0027* (2020.02); *B60W 60/0015* (2020.02); *G06V 10/764* (2022.01);
(Continued)

(58) Field of Classification Search
CPC ........ B60W 40/09; B60W 60/00; G06N 3/02; G06V 20/58; G06V 10/64
See application file for complete search history.

(56) References Cited

U.S. PATENT DOCUMENTS 11,420,653 B2 *  8/2022  Jeon .................. B60W 60/0016
12,077,177 B2 *  9/2024  Hagaribommanahalli ..................
                                                    G06V 20/58
(Continued)

FOREIGN PATENT DOCUMENTS

DE    102020134346 A1    12/2021
DE    102020214715 A1     5/2022
(Continued)

*Primary Examiner* — Tan Q Nguyen
(74) *Attorney, Agent, or Firm* — NORTON ROSE FULBRIGHT US LLP

(57) ABSTRACT

A method for classifying a driving behavior of a road user in the environment of an ego vehicle. The method includes: receiving trajectory data of a driving trajectory of a road user arranged in the environment of an ego vehicle; ascertaining a latent-space representation of the driving trajectory of the road user in a latent space; ascertaining a distance of the latent-space representation of the driving trajectory of the road user to a latent-space representation of at least one normal trajectory in the latent space and classifying a driving behavior of the road user as a normal driving behavior if the distance in the latent space falls below a predetermined limit value; or classifying the driving behavior of the road user as an abnormal driving behavior if the distance in the latent space exceeds the predetermined limit value.

15 Claims, 6 Drawing Sheets

(51) Int. Cl.
*G06V 10/764* (2022.01)
*G06V 20/58* (2022.01)

(52) U.S. Cl.
CPC ..... *G06V 20/58* (2022.01); *B60W 2554/4041* (2020.02); *B60W 2554/4046* (2020.02); *B60W 2554/80* (2020.02)

(56) References Cited

U.S. PATENT DOCUMENTS

| | | | | |
|---|---|---|---|---|
| 2016/0075280 | A1* | 3/2016 | Shin | B60W 30/12 |
| | | | | 348/148 |
| 2018/0257647 | A1* | 9/2018 | Jurca | G01S 13/931 |
| 2019/0302777 | A1* | 10/2019 | Kindo | B60W 60/00276 |
| 2020/0293041 | A1* | 9/2020 | Palanisamy | G06N 3/08 |
| 2020/0331473 | A1* | 10/2020 | Schiegg | G06N 3/045 |
| 2023/0159047 | A1* | 5/2023 | Jiang | G06N 3/006 |
| | | | | 701/25 |

FOREIGN PATENT DOCUMENTS

| | | |
|---|---|---|
| DE | 102021203587 A1 | 10/2022 |
| DE | 102021203588 A1 | 10/2022 |
| DE | 102021203589 A1 | 10/2022 |

\* cited by examiner

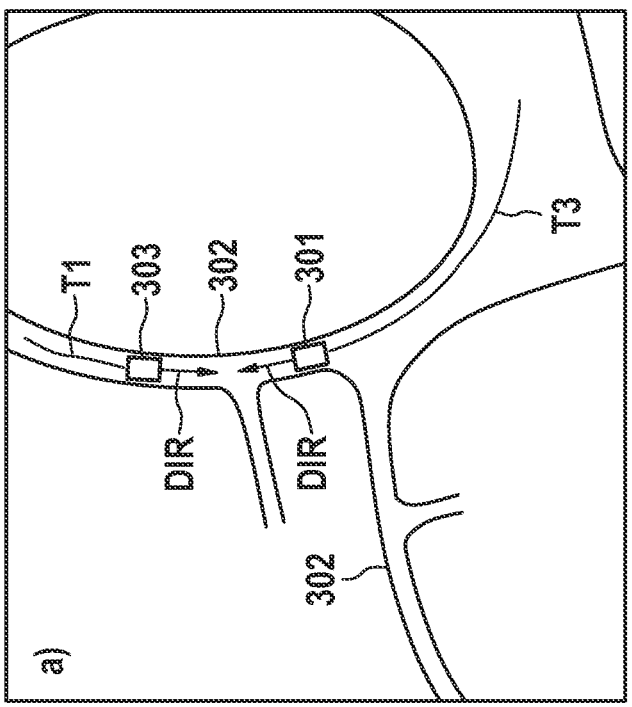
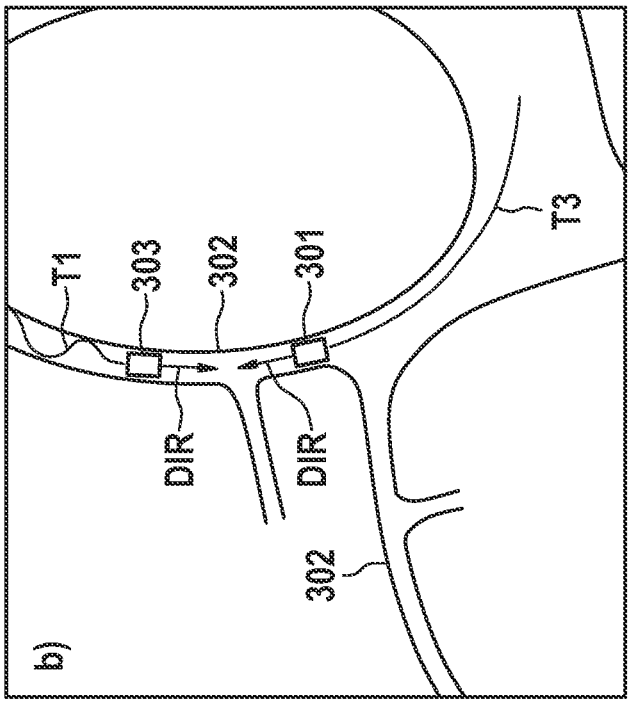
FIG. 3

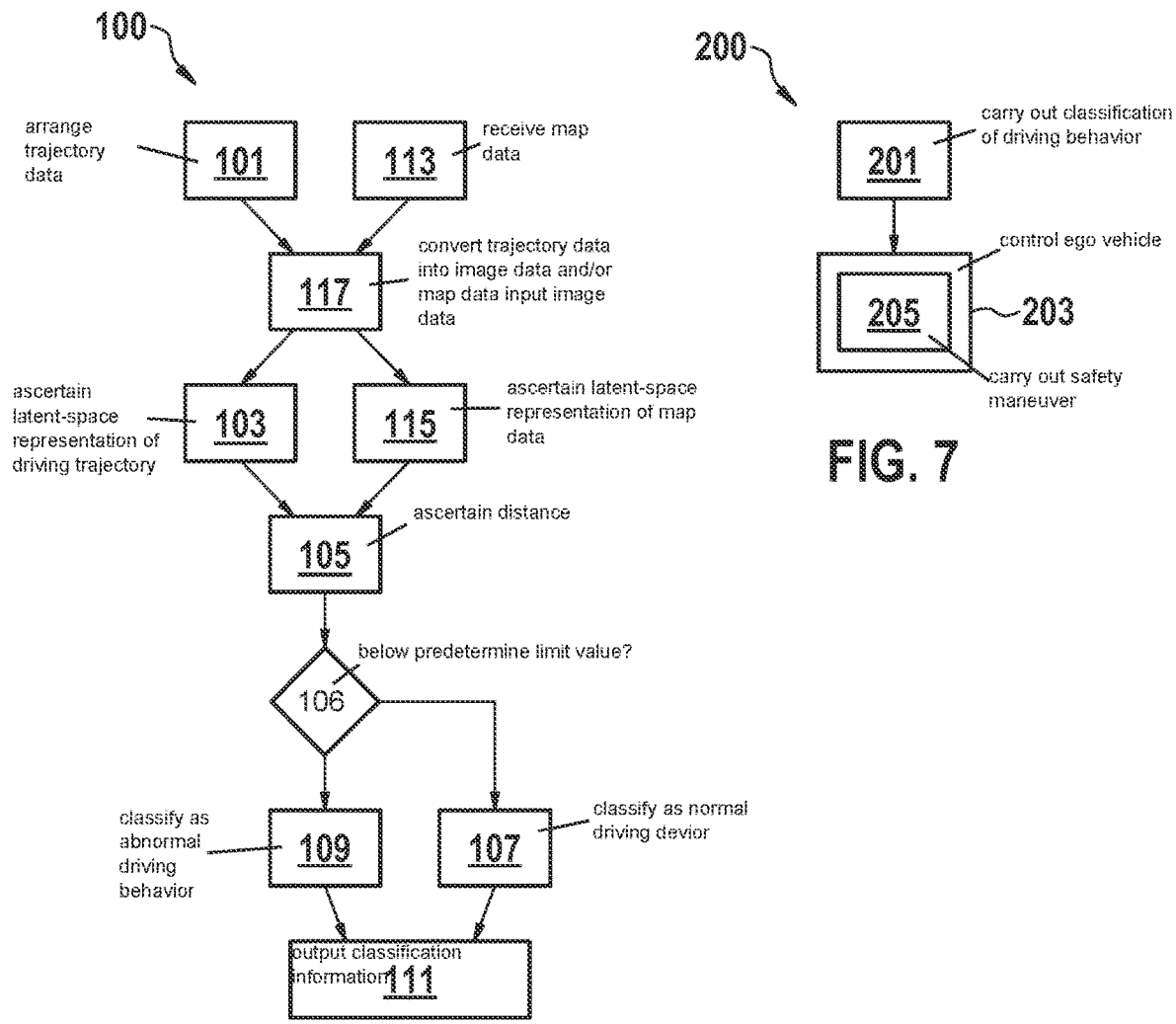
FIG. 6
FIG. 7
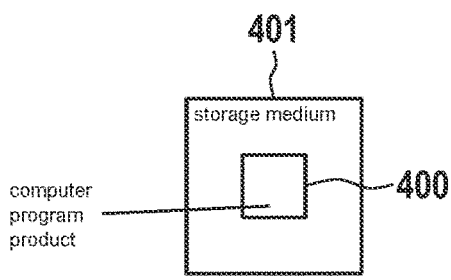
FIG. 8

METHOD FOR CLASSIFYING A BEHAVIOR OF A ROAD USER AND METHOD FOR CONTROLLING AN EGO VEHICLE

CROSS REFERENCE

The present application claims the benefit under 35 U.S.C. § 119 of German Patent Application No. DE 10 2022 205 120.3 filed on May 23, 2022, which is expressly incorporated herein by reference in its entirety.

FIELD

The present invention relates to a method for classifying a driving behavior of a road user in an environment of an ego vehicle. The present invention also relates to a method for controlling an ego vehicle.

BACKGROUND INFORMATION

A proper assessment of future driving behavior of further road users is essential for controlling vehicles, in particular autonomously controllable vehicles. For safely controlling the vehicle, it is in particular important to be able to distinguish between normal driving behavior, where unforeseeable actions are not expected, and abnormal driving behavior, which deviates from normal driving behavior and where unforeseeable actions are expected to be carried out in the future, in order to be able to adjust, if necessary, the driving behavior of the vehicle to be controlled.

SUMMARY

It is an object of the present invention to provide an improved method for classifying a driving behavior of a road user in an environment of an ego vehicle and an improved method for controlling an ego vehicle.

This object may be achieved by the method for classifying a driving behavior of a road user in an environment of an ego vehicle and by the method for controlling an ego vehicle of the present invention. Advantageous configurations of the present invention are disclosed herein.

According to an aspect of the present invention, a method for classifying a driving behavior of a road user in the environment of an ego vehicle is provided. According to an example embodiment of the present invention, the method comprises:

receiving trajectory data of a driving trajectory of a road user arranged in the environment of an ego vehicle, wherein the trajectory data comprise at least position information of the driving trajectory followed by the road user;

ascertaining a latent-space representation of the driving trajectory of the road user in a latent space, wherein the latent-space representation of the driving trajectory is given by a reduced-dimension representation of the trajectory data;

ascertaining a distance of the latent-space representation of the driving trajectory of the road user to a latent-space representation of at least one normal trajectory in the latent space, wherein the normal trajectory is classified as a driving trajectory based on a normal driving behavior; and classifying a driving behavior of the road user as a normal driving behavior if the distance of the latent-space representation of the driving trajectory of the road user to the latent-space representation of the at least one normal trajectory in the latent space falls below a predetermined limit value; or classifying the driving behavior of the road user as an abnormal driving behavior if the distance of the latent-space representation of the driving trajectory of the road user to the latent-space representation of the at least one normal trajectory in the latent space exceeds the predetermined limit value; and outputting classification information.

This can achieve the technical advantage that an improved method for classifying a driving behavior of a road user in the environment of an ego vehicle can be provided. For this purpose, according to the present invention, trajectory data of a driving trajectory of the road user are received and latent-space representations for the corresponding trajectory data are ascertained. The latent-space representations are representations of the trajectory data in the latent space and describe a reduced-dimension representation of the trajectory data.

According to the present invention, corresponding representations in the latent space are calculated by an appropriately trained artificial intelligence based on the received trajectory data of the driving trajectories of the road users. For example, these representations may be designed in vector representation and represent reduced-dimension descriptions of the information of the trajectory data. The conversion of the trajectory data of the driving trajectories into corresponding latent-space representations can thus be interpreted as an encoding of the information of the trajectory data. The latent-space representations comprise the information or the majority of the information of the respectively associated trajectory data but have a reduced-dimension representation in comparison to the representation of the original trajectory data. The latent space is here seen as the set of all latent-space representations of the trajectory data and can be multi-dimensional according to the dimensionality of the latent-space representations.

According to an example embodiment of the present invention, when converting the trajectory data into corresponding latent-space representations, the appropriately trained artificial intelligence performs this calculation of the latent-space representations according to relevant criteria and similar or identical trajectory data thus result in similar or identical latent-space representations. On the other hand, different trajectory data, which are based on very different driving trajectories, will have latent-space representations that differ greatly from one another. Latent-space representations within the meaning of the application are designed as vector representations. Identical or similar latent-space representations are therefore vector representations with identical or only slightly different entries. Slightly different entries result in small differences, while the same entries have a difference of zero. Since similar or identical vector representations result in small or vanishing differences, the similar or identical latent-space representations will thus be arranged very closely together within the latent space. On the other hand, greatly different trajectory data, which are based on very different driving trajectories, result in latent-space representations that are arranged at a greater distance from one another in the latent space.

Since the latent-space representations are preferably designed in vector representation, a similarity determination of the respectively associated trajectory data or of the corresponding driving trajectories can thus be ascertained via a simple determination of the distance between the individual latent-space representations within the latent space. Similar or identical driving trajectories thus result in latent-space representations with very small distances in the latent space, while greatly different driving trajectories have latent-space representations that have correspondingly larger distances from one another in the latent space.

Furthermore, according to the present invention, driving trajectories based on a normal driving behavior will be greatly similar to one another, while driving trajectories based on an abnormal driving behavior will have great differences from the diving trajectories of the normal driving behavior.

A normal driving behavior is characterized in that traffic regulations are complied with. The respective vehicle thus drives in the prescribed direction of travel in the correspondingly designated lane of the roadway. No unforeseen driving maneuvers are carried out. The vehicle instead follows the path of the roadway evenly, without jerky steering movements and with an even velocity profile. Furthermore, the vehicle only drives in the lanes provided for this purpose, and not beyond roadway boundaries or, for example, on the walkway.

Driving trajectories for vehicles driving in this normal manner will thus be highly similar to one another since the paths of the respective driving trajectories are largely defined by the paths of the roadways traveled and by the prevailing traffic rules.

On the other hand, vehicles that do not adhere to the path of the roadway or to the prevailing traffic rules have driving trajectories that are highly different from the driving trajectories of the normal driving behavior. These driving trajectories may have any deviations from the above-described behaviors of vehicles driving normally. For example, the trajectories may have deviations from the paths of the roadways traveled. Jerky steering movements or wavy lines or zig-zag movements may be carried out. Great velocity differences or the general non-compliance with prevailing traffic rules may be discernible. The respective vehicles may deviate from the intended lanes and may drive on walkways or in the wrong direction of travel, for example.

While driving trajectories of a normal driving behavior thus have identical or very similar latent-space representations that are arranged very closely together in the latent space, driving trajectories based on an abnormal driving behaviors have latent-space representations that are greatly different from the latent-space representations of the normal driving behavior and are arranged correspondingly far from these latent-space representations in the latent space.

Based on this idea, the method according to the present invention provides to classify the driving behavior of a road user in the environment of the ego vehicle based on the respective driving trajectory of the road user by determining the distance of a latent-space representation of the trajectory data of the driving trajectory of the road user to known latent-space representations of driving trajectories that are known to be based on a normal driving behavior and that are referred to in the present application as normal trajectories, as normal driving behavior or as abnormal driving behavior.

The determination of the distance of the latent-space representations of the driving trajectories of the road users in the environment of the ego vehicle to the latent-space representations of the normal trajectories, based on a normal driving behavior, in the latent space thus enables a simple and precise classification of the driving behavior of the road user in the environment of the ego vehicle. The driving behavior of the road user in the environment of the ego vehicle is classified as a normal driving behavior if the respective latent-space representation of the driving trajectory of the road user has a distance to latent-space representations of normal trajectories in the latent space that is less than a predetermined limit value. If, on the other hand, the distance between the latent-space representation of the driving trajectory of the road user to the latent-space representations of the normal trajectories in the latent space is greater than the predetermined limit value, the driving behavior of the road user, which has led to the respective driving trajectory, is classified as an abnormal driving behavior.

Based on the conducted classification of the driving behavior of the road users in the environment of the ego vehicle, a control of the ego vehicle can be adjusted to the correspondingly classified behavior of the road user. For example, safety functions predetermined by the ego vehicle may be carried out if an abnormal driving behavior is detected. This can in turn improve the control of the ego vehicle and can increase the safety of the ego vehicle.

The ego vehicle may be a partially automated, highly automated or fully automated controllable vehicle within the meaning of the application. Road users may include further vehicles, in particular trucks, passenger cars, buses, motorcycles, or bicycles. A roadway within the meaning of the application may be a highway, a country road, an inner-city road, a traffic-calmed road, or a parking lot.

According to one embodiment of the present invention, the distance is determined by a predetermined distance metric, wherein the distance metric is given by a Euclidean distance function or by a logarithmic likelihood function of the latent-space representations within the latent space.

This can achieve the technical advantage that a precise distance determination between the latent-space representations of the trajectory data of the driving trajectories of the road users in the environment of the ego vehicle and the latent-space representations of the known normal trajectories of the known normal driving behavior within the latent space is enabled. Since the latent-space representations are preferably designed as vector representations, it is possible to perform technically simple distance determinations between various latent-space representations. This enables precise distance determination and, based thereon, precise classification of the respective driving behavior.

According to one embodiment of the present invention, the classification is carried out by a classification module, wherein the classification module comprises an appropriately trained encoder module of an autoencoder architecture for ascertaining the latent-space representation of the driving trajectory of the road user, wherein the autoencoder architecture is trained to ascertain latent-space representations of driving trajectories in the latent space and to recognize and classify them as driving trajectories based on normal driving behavior.

This can achieve the technical advantage that precise classification of the driving behavior of the road users is enabled. For this purpose, an autoencoder architecture is used to learn the latent-space representations of the trajectory data, in particular of the normal trajectories, during training of the autoencoder architecture. The corresponding encoder module of the autoencoder architecture is correspondingly configured, upon completion of the training, to generate latent-space representations of trajectory data of driving trajectories. As described above, the latent-space representations are calculated based on learned criteria so that similar or identical trajectory data of similar or identical driving trajectories results in similar or identical latent-space representations. Trajectory data of trajectories that deviate greatly from normal trajectories, on the other hand, result in greatly deviating or different latent-space representations.

Through the corresponding training of the autoencoder architecture, the respective encoder module is thus configured to arrange latent-space representations of similar driving trajectories in the latent space closely together and to arrange latent-space representations of greatly deviating driving trajectories in the latent space correspondingly further away.

Latent-space representations are arranged closely together in the latent space within the meaning of the application if the respective vector representations of the latent-space representations have similar or identical entries. On the other hand, latent-space representations are arranged correspondingly apart from one another in the latent space within the meaning of the application if the respective vector representations of the latent-space representations have greatly different entries from one another.

According to one embodiment of the present invention, the method furthermore comprises:
receiving map data of a map representation mapping the environment of the ego vehicle;
ascertaining a latent-space representation of the map data of the map representation in the latent space, wherein the latent-space representation of the driving trajectory is given by a reduced-dimension representation of the map data; and wherein ascertaining the distance and/or classifying the behavior of the road user takes place taking into account the latent-space representation of the map data of the map representation.

This can achieve the technical advantage that a precise latent-space representation of the trajectory data of the driving trajectories of the road users positioned in the environment of the ego vehicle is enabled by the classification module. By taking into account the map data of the map representation mapping the roadway traveled by the ego vehicle and the further road users, additional information can be taken into account in ascertaining the latent-space representations of the trajectory data of the driving trajectories of the road users. The additional information of the map data enables a more precise classification of the normal or of the abnormal behavior of the road user. By taking the map data into account, a match of the path of the driving trajectory with the path of the traveled roadway can in particular be better taken into account. A considerable match of the path of the driving trajectory with the path of the roadway indicates a normal driving behavior, while a greatly deviating path of the driving trajectory from the path of the roadway indicates an abnormal behavior.

According to one embodiment of the present invention, the method furthermore comprises:
converting the trajectory data into image data of the trajectory data and/or converting the map data into image data of the map data; and wherein ascertaining the distance and/or classifying the behavior of the road user takes place based on the image data of the trajectory data and/or based on the image data of the map data.

This can achieve the technical advantage that the image data of the trajectory data and/or the image data of the map data of the map representation enable the latent-space representations of the trajectory data and/or of the map data to be ascertained more precisely. This in turn enables the driving behavior of the road users of the ego vehicle to be classified more precisely.

According to one embodiment of the present invention, the classification module furthermore comprises a connection network, wherein the connection network is configured to combine a plurality of image data of the trajectory data and/or a plurality of image data of the map data into input data for the encoder module in vector representation, and/or wherein the classification module furthermore comprises a map network, wherein the map network is configured to ascertain latent-space representations of the map data based on the image data of the map data, and wherein the connection network and/or the map network are designed as appropriately trained neural networks.

This can achieve the technical advantage that a further improvement of the classification of the behavior of the road users is enabled. For this purpose, a connection network of the classification module first combines the plurality of image data of the trajectory data and/or the image data of the map data into input data for the encoder module. By combining the image data of the trajectory data and of the map data, the position information of the trajectory data can be compared with the position information of the map data and a more precise position determination or a more precise comparison of the paths of the driving trajectories with the paths of the traveled roadway can thus be brought about. In particular, by the processing by the connection network, the trajectory data and the map data can be processed together into the common input data for the encoder module, whereby an additional increase in the precision of the latent-space representations of the trajectory data and of the map data can be achieved. Furthermore, the classification module comprises a map network configured to convert the image data of the map data into corresponding latent-space representations. This in turn enables a highly precise representation of the map data in the latent space. This in turn enables a further increase in the precision of the classification of the driving behaviors of the road users. By designing the connection network and the map network as appropriate trained neural networks, the performance of the classification module can in turn be increased.

According to one embodiment of the present invention, the autoencoder architecture is designed as a variational autoencoder VAE, wherein the latent-space representations of the driving trajectories are designed as statistical distributions in the latent space and are each characterized by an expected value $\mu$ and a variance $\sigma^2$.

This can achieve the technical advantage that by designing the autoencoder architecture as a variational autoencoder VAE, and in particular by the resulting design of the latent-space representations as statistical distributions in the latent space, the statistical distributions can introduce an aspect of uncertainty into the training of the autoencoder architecture. As a result, the problem of overfitting during the training of the autoencoder architecture can be avoided. This enables an improved training process and an encoder module that is correspondingly better trained.

According to one embodiment of the present invention, the distributions in the latent space are designed as Gaussian normal distributions.

This can achieve the technical advantage that a statistical distribution of the latent-space representations that is as simple and easily manageable as possible is achieved. The Gaussian normal distribution facilitates the handling of the statistical distributions of the latent-space representations.

According to one embodiment of the present invention, the training of the autoencoder architecture is carried out on trajectory data of a plurality of trips of a vehicle or of a plurality of vehicles along a roadway traveled by the ego vehicle, wherein map information of a map representation mapping the respective traveled roadway and/or information regarding a roadway condition and/or information regarding prevailing traffic regulations and/or information regarding prevailing traffic volumes and/or information regarding prevailing weather conditions and/or time-of-day and/or day-of-the-week information are also taken into account in the training.

This can achieve the technical advantage that precise training of the autoencoder architecture is enabled. For this purpose, trajectory data recorded on a plurality of trips of a plurality of vehicles or of at least one vehicle along various roadways are taken into account as training data. For example, only trajectory data of driving trajectories based on a normal driving behavior of the respective vehicles may be taken into account in the training of the autoencoder architecture. During the training, the corresponding autoencoder architecture is thus trained to generate the corresponding latent-space representations of the trajectory data of the normal trajectories and to arrange them in the latent space correspondingly closely to one another due to the high similarity of the normal trajectories. In order to increase the precision of the calculation of the latent-space representations of the trajectory data of the normal trajectories, information of a map representation or information of a roadway condition or information of prevailing traffic regulations or information regarding a prevailing traffic volume or weather conditions or time-of-day and/or day-of-the-week information, which each describe in more detail the conditions under which the trajectory data were recorded during the plurality of trips of the vehicles, can also be taken into account in the training. The additional information can further specify the driving behavior of the vehicles to be respectively classified as normal. Taking into account the various categories of information is based on the idea that the respective driving behavior can turn out differently depending on the traffic volumes or weather conditions, road surfaces or times of day or days of the week. Taking them into account thus enables a precise definition of the normal driving behavior and enables the autoencoder architecture to classify more accurately and create the respective latent-space representations of the recorded trajectory data more precisely. Upon completion of the training, the encoder module of the autoencoder architecture is better configured to generate a corresponding latent-space representation, whereby the corresponding classification module is better configured to carry out the classification of the driving behavior of the road users arranged in the environment of the ego vehicle.

According to one embodiment of the present invention, a normal driving behavior of the road user comprises:
  driving in a lane, designated according to prevailing traffic regulations, of the traveled roadway; and/or
  driving according to prevailing speed regulations;
  following a path of the roadway; and/or
  driving in a direction of travel designated by prevailing traffic regulations for the respectively traveled roadway and/or lane; and wherein an abnormal driving behavior comprises:
  not following the path of the roadway; and/or
  driving in a meandering direction of travel deviating from a straight direction of travel; and/or
  driving in a direction of travel opposite the direction of travel designated according to the prevailing traffic regulation; and/or
  driving at an excessive speed; and/or
  driving in a lane not designated according to the prevailing traffic regulations.

This can achieve the technical advantage that precise classification of the driving behavior of the further road users is enabled.

According to one embodiment of the present invention, the received trajectory data of the further road user in the environment of the ego vehicle are based on environmental sensor data of at least one environmental sensor of the ego vehicle, wherein the environmental sensor data comprise camera data, LiDAR data, RADAR data, and/or acoustic data.

This can achieve the technical advantage that precise ascertainment of the trajectory data of the driving trajectories of the road users arranged in the environment of the ego vehicle is enabled. This allows a precise classification of the driving behavior of the respective road users.

According to a further aspect of the present invention, a method for controlling a vehicle is provided. According to an example embodiment of the present invention, the method includes: carrying out a classification of a driving behavior of a road user in the environment of an ego vehicle based on trajectory data of the road user according to the method for classifying a driving behavior of a road user of an ego vehicle according to one of the preceding embodiments of the present invention; and controlling the ego vehicle, taking into account the classification of the driving behavior of the further road user.

This can achieve the technical advantage that an improved method for controlling an ego vehicle can be provided. By carrying out the method for classifying a driving behavior of a road user of an ego vehicle, an improved classification can be achieved with the aforementioned technical advantages.

According to one embodiment of the present invention, controlling the ego vehicle comprises:
  carrying out a safety maneuver if the driving behavior of the further road user is classified as an abnormal driving behavior.

This can achieve the technical advantage that a corresponding response to the classified driving behavior of the road user is enabled and allows safe driving of the ego vehicle. By carrying out the safety maneuver, it is possible to respond to abnormal driving behavior of further road users in order to be able to ensure the safety of the ego vehicle.

According to one embodiment of the present invention, the safety maneuver comprises:
  reducing a speed of the ego vehicle; and/or
  increasing a distance of the ego vehicle to the further road user; and/or
  changing a lane, traveled by the ego vehicle, of the traveled roadway.

This can achieve the technical advantage that it is possible to carry out effective safety maneuvers that can ensure a safety of the ego vehicle. The safety of the ego vehicle within the meaning of the application relates to a collision-free trip of the ego vehicle without collision with the further road user. The safety maneuver to be carried out can in particular be selected, taking into account the respectively classified abnormal behavior of the further road user.

According to a further aspect of the present invention, a computing unit is provided and configured to carry out the method for classifying a driving behavior of a road user in the environment of an ego vehicle according to one of the preceding embodiments of the present invention and/or the method for controlling an ego vehicle according to one of the preceding embodiments of the present invention.

According to a further aspect of the present invention, a computer program product is provided and comprises instructions that, when the program is executed by a data processing unit, cause the latter to carry out the method for classifying a driving behavior of a road user in the environment of an ego vehicle according to one of the preceding embodiments of the present invention and/or the method for controlling an ego vehicle (301) according to one of the preceding embodiments of the present invention.

Exemplary embodiments of the present invention are explained with reference to the figures.

BRIEF DESCRIPTION OF THE DRAWINGS

FIG. 3 shows schematic representations of two driving situations of an ego vehicle.

FIG. 6 shows a flow chart of a method for trajectory planning for an ego vehicle, according to an example embodiment of the present invention.

FIG. 7 shows a flow chart of a method for controlling an ego vehicle, according to an example embodiment of the present invention.

FIG. 8 shows a schematic representation of a computer program product, according to an example embodiment of the present invention.

DETAILED DESCRIPTION OF EXAMPLE EMBODIMENTS

Figure 1:
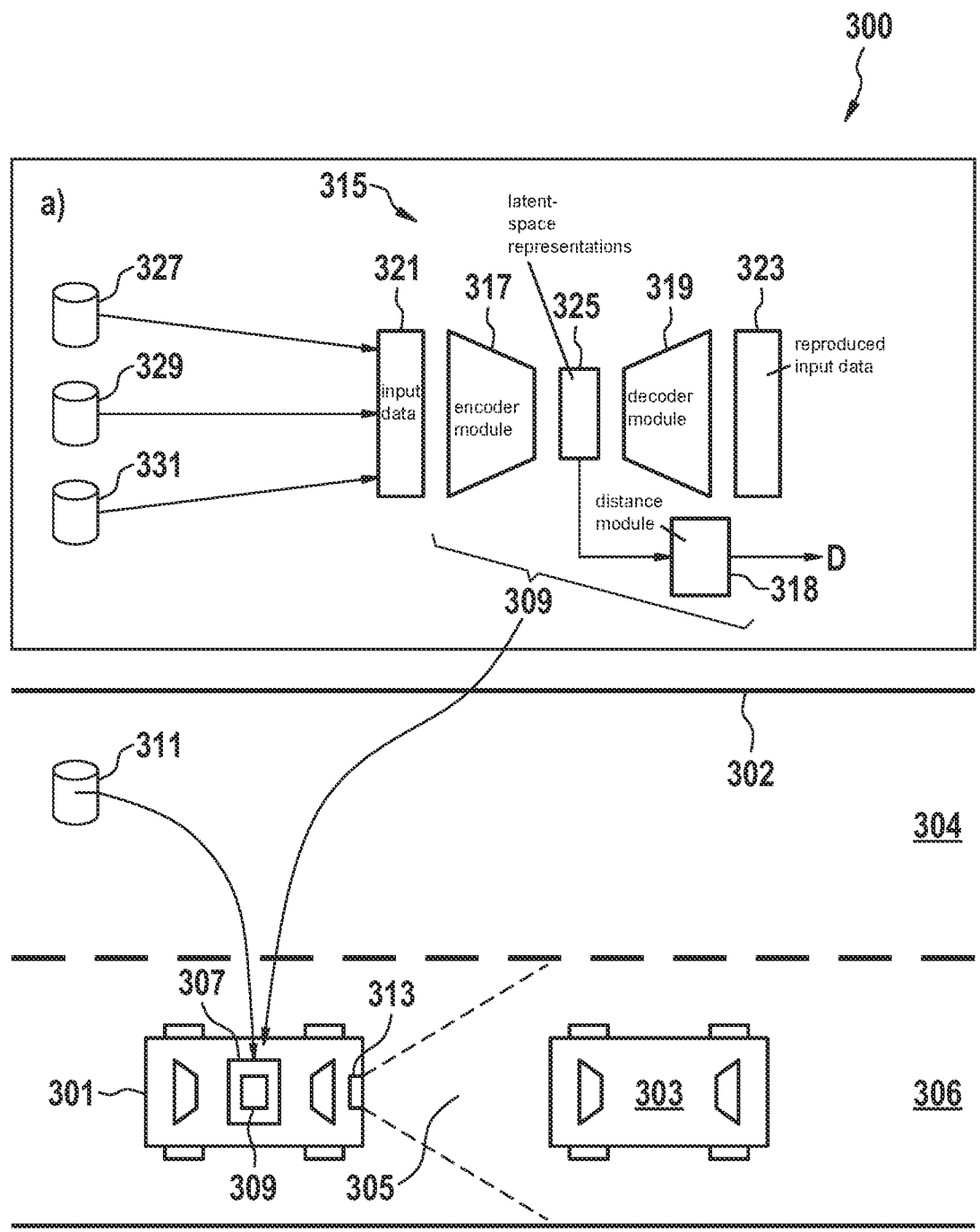
FIG. 1 shows a schematic representation of a system for classifying a driving behavior of a road user in the environment of an ego vehicle, according to an example embodiment of the present invention.

FIG. 1 shows a schematic representation of a system 300 for classifying a driving behavior of a road user 303 in the environment 305 of an ego vehicle 301.

FIG. 1 shows a traffic situation with an ego vehicle 301 driving on a roadway 302. A further road user 303 is arranged, as a further vehicle in the embodiment shown, in the environment 305 of the ego vehicle 301. The ego vehicle 301 comprises a computing unit 307 with a classification module 309. The classification module 309 is configured to carry out the method according to the present invention for classifying a driving behavior of a further road user 303 in the environment 305 of an ego vehicle 301.

For classifying a driving behavior of the road user 303, trajectory data 311 are first received by the computing unit 307 or the classification module 309. The trajectory data 311 describe a driving trajectory of the road user 303 and comprise at least position information of the road user 303 at various time points. The trajectory data 311 may additionally comprise velocity information of the road user 303.

The ego vehicle 301 furthermore comprises at least one environmental sensor 313 by means of which the environment 305 of the ego vehicle 301 can be perceived. The trajectory data 311 may thus be given by environmental sensor data of the environmental sensor 313; the driving trajectory carried out by the road user 303 can accordingly be detected by the environmental sensors 313 of the ego vehicle 301. The environmental sensor data may comprise LiDAR data, radar data, camera data, and/or acoustic data of corresponding acoustic sensors.

For classifying the driving behavior, the classification module 309 is configured to calculate latent-space representations 325 for the received trajectory data 311 of the road user 303. The latent-space representations 325 describe reduced-dimension representations of the trajectory data 311. The latent-space representations 325 thus represent representations of the corresponding trajectory data 311 in a latent space 333 and may be designed, for example, as vector representations of the trajectory data 311.

In the embodiment shown, the classification module 309 comprises, for this purpose, an encoder module 317 of an autoencoder architecture 315 shown simplified in graph a).

The autoencoder architecture 315 comprises a corresponding decoder module 319 in addition to the encoder module 317. The autoencoder architecture 315 is configured to calculate latent-space representations 325, corresponding to the input data 321, in the latent space. Since the latent-space representations 325 of the input data 321 at least largely comprise the information of the input data 321 but are reduced in dimensionality in comparison to the input data 321, the latent-space representations 325 represent an encoding of the information of the input data 321. The decoder module 319 of the autoencoder architecture 315 is furthermore configured to, based on the latent-space representations 325 of the input data 321, reproduce the input data 321 and generate corresponding reproduced input data 323.

By correspondingly training the autoencoder architecture 315, corresponding latent-space representations 325 can thus be created for given input data 321.

According to the present invention, the autoencoder architecture 315 is thus trained based on trajectory data 327. The trajectory data 327 are based on a plurality of trips of a vehicle or a plurality of vehicles and describe the driving trajectories respectively carried out by the vehicles. The training of the autoencoder architecture 315 may furthermore be carried out, taking into account map data 329 comprising map information of the roadways traveled by the respective vehicles for the purpose of recording the trajectory data 327. Furthermore, information regarding the roadway condition, the traffic volume, regarding weather conditions, regarding times of day or days of the week as well as regarding prevailing traffic regulations that existed during the trips for recording the trajectory data 327 can be taken into account in the training. The corresponding trajectory data 327, map data 329, or data of said information 331 can be taken into account in the shown input data 321 of the autoencoder architecture 315.

After corresponding training of the autoencoder architecture 315, the respective encoder module 317 is configured to calculate corresponding latent-space representations 325 in the latent space for the received trajectory data 311 of the driving trajectory carried out by the road user 303.

During the training of the autoencoder architecture 315, trajectory data 327 of driving trajectories based on a normal driving behavior of the respective vehicles are primarily used. The normal driving behavior is characterized in that prevailing traffic rules are taken into account, in that the respective vehicle follows the path of the traveled roadway evenly, in that no jerky or unforeseeable steering movements or maneuvers are carried out, and in that there is, for example, an even velocity profile. The normal driving behavior can be adjusted to the respective weather conditions, the present traffic volume, the time of day or the day of the week as well as to the respective roadway conditions or the prevailing traffic rules. The features of a normal driving behavior mentioned herein are merely exemplary. A normal driving behavior may comprise more or less of the mentioned features, depending on the traffic situation. A limitation of the present invention is not to be achieved thereby.

Driving trajectories of a normal driving behavior, which are called normal trajectories within the meaning of the application, show great similarities to one another and differ only slightly from one another. The corresponding driving trajectories have largely common paths that correspond to the paths of the respective roadway and are also similar to one another in terms of steering movements or maneuvers carried out as well as the respective velocity of the vehicle.

During the training of the autoencoder architecture 315, the encoder module 317 is trained to convert the trajectory data 327 into corresponding latent-space representations 325. The encoder module 317 is trained to convert similar or identical trajectory data 327 into similar or identical latent-space representations 325. Similar or identical latent-space representations 325 have, according to the present invention, only small distances to one another in the latent space and are arranged in common regions in the latent space. Similar or identical latent-space representations 325 describe vector representations whose entries are the same or have only slight deviations from one another.

On the other hand, driving trajectories based on abnormal driving behavior, which, for example, comprises a failure to comply with prevailing traffic regulations, not following the path of the traveled roadway or a presence of jerky steering movements, uneven velocity profiles or, for example, zigzag or meandering driving behavior, are converted by the appropriately trained encoder module 317 into corresponding latent-space representations 325 that have a relatively large distance in the latent space to the latent-space representations 325 of the normal trajectories.

For classifying the driving trajectories of the road users 303 arranged in the environment 305 of the ego vehicle 301, the classification module 309 is configured to determine distances between latent-space representation 325 of the received trajectory data 311 of the driving trajectories driven by the road users 303, in the latent space to latent-space representations 325 of normal trajectories that were learned during the training process of the autoencoder architecture 315 by the autoencoder architecture 315, and in particular by the encoder module 317.

For this purpose, the classification module 309 comprises a distance module 318 in addition to the encoder module 317. The distance module 318 is configured to determine distances D of the latent-space representations 325 of the received trajectory data 311 of the driving trajectories of the road users 303 to the learned latent-space representations 325 of the normal trajectories.

The distances D may be ascertained by the distance module 318 according to a predetermined distance metric within the latent space. For example, the distance metric may be given by a Euclidean distance function or by a logarithmic likelihood function. By means of the mentioned functions, the distance module 318 can thus ascertain distances between the latent-space representations 325 of the received trajectory data 311 of the driving trajectories of the road users 303 to the latent-space representations 325, learned in the training process, of the normal trajectories based on normal driving behavior.

Based on the ascertained distances D, the classification module 309 classifies the driving behavior of the road users 303 arranged in the environment 305. In so doing, a driving behavior of a road user 303 is classified as a normal driving behavior if the respective latent-space representations 325 of the corresponding driving trajectories of the road user 303 have a distance D to latent-space representations 325 of the normal trajectories in the latent space that is less than a predetermined limit value. On the other hand, if the latent-space representations 325 of the driving trajectories carried out by the respective road user 303 have distances D to the latent-space representations 325 of the normal trajectories in the latent space that are greater than or equal to the predetermined limit value, the corresponding driving behavior of the road user 303 is classified as an abnormal driving behavior.

According to the present invention, classification information is subsequently output, which describes the classification of the driving behavior of the road user 303 arranged in the environment 305.

Based on the classification information, the control of the ego vehicle 301 can be adjusted. For example, a safety maneuver may be carried out or caused if the driving behavior of the road user 303 is classified as an abnormal driving behavior. For example, the corresponding safety maneuver may comprise reducing the speed of the ego vehicle 301 and/or increasing a distance of the ego vehicle 301 to the respective road user 303. Alternatively or additionally, the safety maneuver may comprise a lane change from a traveled lane 306 to a non-traveled lane 304. Alternatively or additionally, further maneuvers may be carried out, which appropriately take into account the driving behavior, correspondingly classified as abnormal driving behavior, of the road user 303 arranged in the environment 305.

According to the present invention, the autoencoder architecture 315, and in particular the encoder module 309, can be designed according to architectures from the related art for autoencoders.

According to one embodiment, the autoencoder architecture 315 is designed as a variational autoencoder VAE. In this case, the correspondingly generated latent-space representations 325 are designed as statistical distributions in the latent space and are each characterized by an expected value $\mu$ and a variance $\sigma^2$. For example, the statistical distributions of the latent-space representations 325 may be designed as Gaussian normal distributions.

The training process of the autoencoder architecture 315 can in particular be designed as a supervised learning process.

According to one embodiment, the training of the autoencoder architecture 315 can be carried out based on image data of the trajectory data 327 and/or on image data of the map data 329. For this purpose, the autoencoder architecture 315 comprises additional components (not shown in FIG. 1) configured to convert the image data into the input data 317 in vector representation. For a detailed description of the autoencoder architecture 315, reference is made to the description of FIGS. 4 and 5.

Analogously, after successfully completed training, for classifying the behavior of the road user 303, the classification module 309 can be carried out taking into account map data 329 in addition to the trajectory data 311 of the road user 303. In particular, the classification of the behavior of the road user 303 by the classification module 309 can take place based on the image data of the trajectory data 311 and/or of the map data 329. For this purpose, the classification module 309 can comprise the additional components of the autoencoder architecture 315 for calculating the input data 317 in vector representation.

Figure 2:
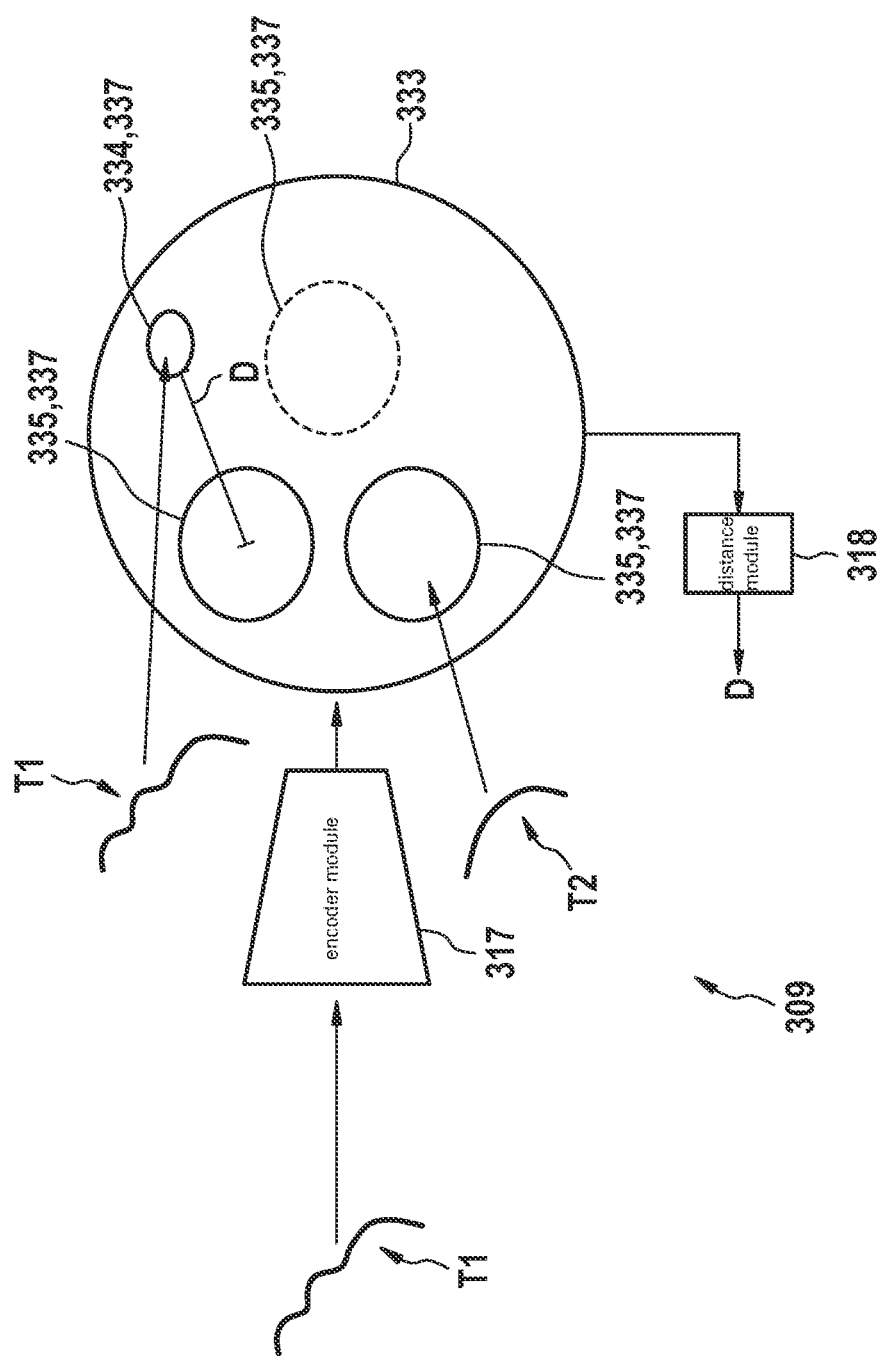
FIG. 2 shows a graphical representation of a classification of a driving behavior, according to an example embodiment of the present invention.

FIG. 2 shows a graphical representation of a classification of a driving behavior.

FIG. 2 shows a graphical and highly simplified representation of the latent space 333 and the respective latent-space representations 335 of the normal trajectories T2 as well as the latent-space representations 334 of the driving trajectories T1 of the road users 303 arranged in the environment 305 of the ego vehicle 301.

During the training process of the autoencoder architecture 315, the corresponding encoder module 317 is trained to generate on the calculation of the latent-space representations 335 of the trajectory data 327 used in the training process. The autoencoder architecture 315, and in particular the encoder module 317, learn to convert normal trajectories T2, which represent a normal driving behavior and are highly similar to one another despite having been carried out by various vehicles, into likewise highly similar latent-space representations 335 that are arranged within the latent space 333 at small distances from one another.

After successful training, the encoder module 317 is thus configured to calculate corresponding latent-space representations 334 in the latent space 333 for the observed driving trajectories T1 of the detected road users 303 and, in particular, for the corresponding trajectory data 311. If the driving trajectories T1 of the road users 303 are based on normal driving behavior, the corresponding latent-space representations 334 will be highly similar to the latent-space representations 335 of the normal trajectories T2 and be arranged in the latent space 333 at a small distance to the respective latent-space representations 334 of the normal trajectories T2. On the other hand, if the driving trajectories T1 of the road users 303 are based on abnormal driving behavior, the corresponding driving trajectories T1 will have great differences from the normal trajectories T2 and the correspondingly generated latent-space representations 334 of the driving trajectories T1 will have a corresponding large distance D to the latent-space representations 335 of the normal trajectories T2 in the latent space 333.

FIG. 2 shows a situation of an abnormal driving behavior of a road user 303. The corresponding driving trajectory T1 has a great difference from the normal trajectories T2, which difference is shown in FIG. 2 by the meandering path of the driving trajectory T1 in comparison to the straight curved path of the normal trajectory T2. The correspondingly generated latent-space representation 334 of the driving trajectory T1 thus has a relatively large distance D to the latent-space representations 335 of the normal trajectories T2.

FIG. 2 shows three latent-space representations 335 for three different normal trajectories T2 in the latent space 333. This is only exemplary. In reality, a plurality of different trajectories T2 can be ascertained, which are all based on normal driving behavior, differ from one another but have a large number of commonalities due to the underlying normal driving behavior, and are thus arranged in a comparatively narrow area within the latent space 333. In FIG. 2, the distances between the latent-space representations 334, 335 are not to scale so that the distance D of the latent-space representation 334 to the latent-space representations 335 may appear to be less than the distances between the latent-space representations 335. This is unintended and is owed to the illustration.

According to the present invention, a predetermined limit value is defined for the classification of the driving behavior of the road users 303 and in particular for the distance determination of the distances D of the latent-space representations 334 of the driving trajectories T1 to the latent-space representations 335 of the normal trajectories T2. This limit value can be individually adjusted depending on various criteria, for example the degree of similarity of the normal trajectories T2 for different driving situations.

A correspondingly greater limit value for the distance determination can be selected for driving situations in which the normal trajectories T2 have great differences from one another due to the present driving situation, even though all are based on a normal driving behavior. For driving situations in which the normal trajectories T2 have only slight differences from one another and the corresponding latent-space representations 335 of the individual normal trajectories T2 in the latent space 333 are arranged in a correspondingly smaller area with smaller distances to one another, the predetermined limit value can accordingly be provided with a lower numerical value so that even smaller distances of the latent-space representation 334 of the driving trajectories T1 of the road users 303 to the latent-space representations 335 of the normal trajectories T2 already result in the classification of a normal driving behavior of the respective road users 303.

In the embodiment shown, the autoencoder architecture 315 is designed as a variational autoencoder VAE. The corresponding latent-space representations 335 are formed by statistical distributions 337 within the latent space 333. The statistical distributions 337 are characterized by expected values $\mu$ and variances $\sigma^2$ and are represented in FIG. 2 by the circular structures. The individual latent-space representations 335 thus have corresponding flat formations in the latent space 333 according to the statistical distributions 337 so that the latent space 333 is embodied by a continuous occupancy of the latent-space representations.

As already described with respect to FIG. 1, the classification module 309 comprises, in addition to the encoder module 317, the distance module 318 already described. The distance module 318 is configured to ascertain the distances D between the latent-space representations 334 of the driving trajectories T1, ascertained via the received trajectory data 311, of the road users 303 arranged in the environment 305 of the ego vehicle 301, to the latent-space representations 335, learned in the training process of the autoencoder architecture 315, of the normal trajectories T2 based on normal driving behavior. As already described, this can take place by carrying out a corresponding distance metric, which may be designed, for example, as a Euclidean distance function or a logarithmic likelihood function.

FIG. 3 shows schematic representations of two driving situations of an ego vehicle 301.

The two graphs a) and b) of FIG. 3 show two different driving situations with an ego vehicle 301 and a further road user 303. In both driving situations, both the ego vehicle 301 and the further road user 303 drive in a lane 302. The ego vehicle 301 and the further road user 303 drive in opposite directions of travel in the driving situations shown.

In graph a), the further road user 303 shows a normal driving behavior. The latter is characterized by the relatively straight driving trajectory T1 of the road user 303, the path of which largely follows the path of the traveled roadway 302. The ego vehicle 301 likewise shows a normal driving behavior, which in turn is represented by the relatively straight driving trajectory T3, which in turn follows the path of the traveled roadway 302.

On the other hand, the road user 303 in graph b) shows an abnormal driving behavior. This is represented by the more or less meandering driving trajectory T2 of the road user 303.

Figure 4:
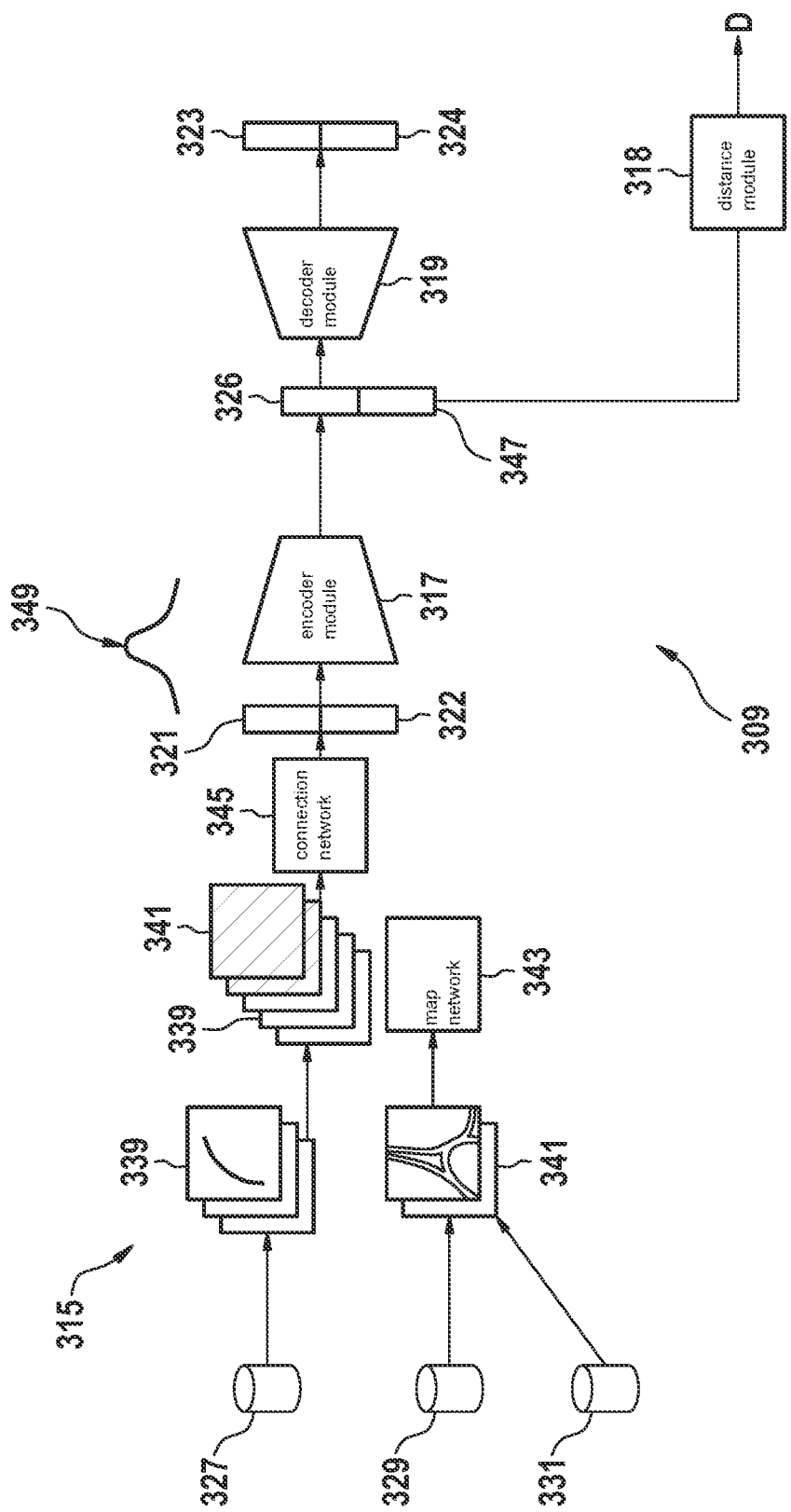
FIG. 4 shows a graphical representation of an autoencoder architecture according to one embodiment of the present invention.

FIG. 4 shows a graphical representation of an autoencoder architecture 315 according to one embodiment.

In the embodiment shown, the autoencoder architecture 315 has, in addition to the encoder module 317 and the decoder module 319, a connection network 345 and a map network 343, which are each designed as appropriately trained neural networks.

In the embodiment shown, for the training of the autoencoder architecture 315, the trajectory data 327 taken into account and the map data 329 taken into account are first converted into corresponding image data 339 of the trajectory data 327 and image data 341 of the map data 329. In the embodiment shown, the information of the data 331 or regarding the traffic volume, prevailing traffic regulations, roadway condition, weather conditions, time of day or day of the week, and the further information described with respect to FIG. 1 are additionally taken into account in the generation of the image data 341 of the map data 329. The individual image data 339 of the trajectory data 327 as well as the image data 341 of the map data 329 have temporal sequences of image data 339, 341. The image data 339 of the trajectory data 327 here describe lateral changes in the driving trajectories T1, described by the trajectory data 327, of the respectively observed road user 303.

In the embodiment shown, the image data 339 of the trajectory data 327 and the image data 341 of the map data 329 are first merged into a common data set that serves as an input data set for the connection network 345. The connection network 345 is configured to generate corresponding input data 321, 322 for the encoder module 317 based on the merged image data 339 and 341. The input data 321, 322 comprise the information of the image data 339 of the trajectory data and the image data 341 of the map data 329 and are each designed in vector representation. During the training process, the encoder module 317 is trained to generate corresponding latent-space representations 326 of the trajectory data 327 based on the input data 321, 322. The latent-space representations 326 take into account the information of the trajectory data 327 and of the map data 329.

The image data 341 of the map data 329 furthermore serve as input data for the map network 343. The latter is configured to generate labeling information 347 of the map data 329 based on the image data 341.

The latent-space representations 326 generated by the encoder module 317 and based on the trajectory data 327 and the map data 329 are provided with the labeling information 347 of the map data 329 generated by the map network 343 based on the image data 341 of the map data 329. A concatenation of the labeling information 347 of the map data 329 to the latent-space representations 326 are used as input data for the decoder module 319. The labeling information 347 of the map data 329 enables easier mapping of the trajectory data 327, and in particular of the associated latent-space representations 326, to the matching map data 329. This enables simplified mapping of the corresponding trajectories to the respective locations within the map representation.

Based on the latent-space representations 326, 347, the decoder module 319 is trained to generate constructed input data 323, 234.

The connection network 345 as well as the map network 343 can each be designed as appropriately trained neural networks, in particular as convolutional networks.

Figure 5:
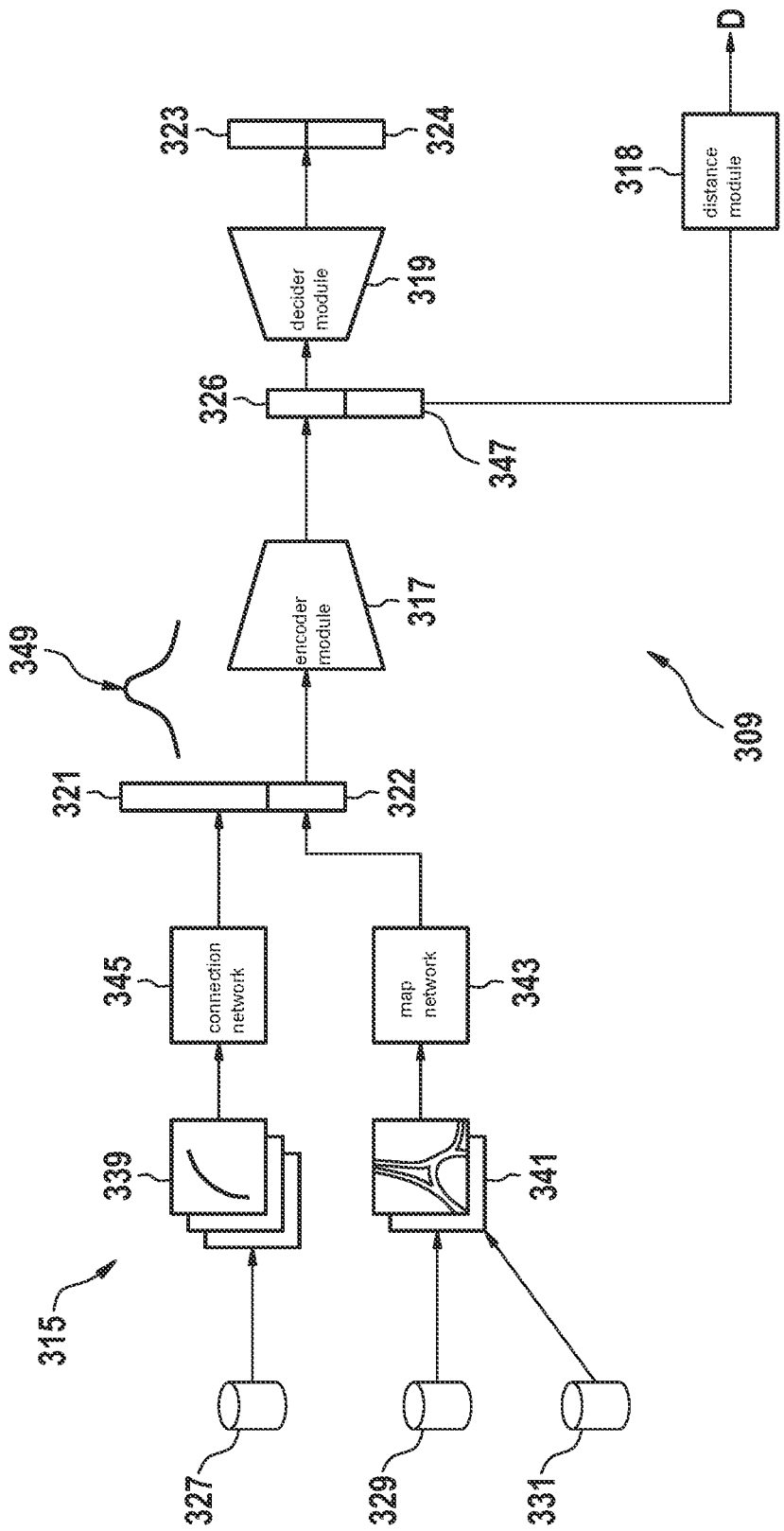
FIG. 5 shows a further graphical representation of an autoencoder architecture according to a further embodiment of the present invention.

FIG. 5 shows a further graphical representation of an autoencoder architecture 315 according to a further embodiment.

The shown embodiment of the autoencoder architecture 315 is based on the embodiment in FIG. 4. The embodiment differs in that the image data 339 of the trajectory data 327 are first generated by the connection network 345 into corresponding input data 321 of the encoder module 317 in vector representation.

Analogously, the image data 341 of the map data 329 are first processed by the map network 343 into corresponding input data 322 for the encoder module 317 in vector representation.

The input data 321 and 322 formed in vector representation are combined into a common vector representation as input data for the encoder module 317.

Analogously to the embodiment in FIG. 4, the map network 343 is furthermore configured to generate corresponding labeling information 347 based on the image data 341 of the map data 329.

Based on the latent-space representations 326 and the labeling information 347, the decoder module 319 is generated to calculate the constructed input data 323, 324.

In the embodiment shown, the autoencoder architecture 315 is designed as a variational autoencoder VAE. The ascertained latent-space representations 326 are designed as statistical distributions with an expected value $\mu$ and a variance $\sigma^2$. In the embodiment shown, the statistical distributions are designed as statistical normal distributions 349. The design of the individual statistical distributions can thus be regulated as a statistical normal distribution 349. This can simplify the manageability of the individual distributions.

In the embodiments shown in FIG. 4 and FIG. 5, in addition to the training of the autoencoder architecture 315, the trajectory data 311 and the corresponding map data 329 are also first converted into corresponding image data 339 and 341 for the appropriately trained classification module 309. The classification module 309 thus also comprises the connection network 345 and the map network 343 in addition to the decoder module 317 and the distance module 318. Furthermore, the classification module 309 is configured to bring about the conversion of the trajectory data 327 and map data 329 into the corresponding image data 339, 341.

FIG. 6 shows a flow chart of a method 100 for classifying a driving behavior of a road user in the environment of an ego vehicle 301.

According to the present invention, in a first method step 101, trajectory data 311 of a driving trajectory T1 of a road user 303 arranged in the environment 305 of the ego vehicle 301 are first received. The trajectory data 311 comprise at least position information of the respective driving trajectory T1. The trajectory data 311 can be based on environmental sensor data of the at least one environmental sensor 313 of the ego vehicle 301. The environmental sensor data may comprise, for example, camera data, LiDAR data, radar data, or acoustic data.

In a further method step 113, map data 329 of a map representation mapping the environment 305 of the ego vehicle 301 are received.

In a further method step 117, the trajectory data 327 are converted into image data 339 of the trajectory data 327 and/or the map data 329 are converted into image data 341 of the map data 329.

In a further method step 103, a latent-space representation 334 of the driving trajectory T1 of the road user 303 in the latent space 333 is ascertained based on the image data 339 of the trajectory data 311.

In a method step 115, a latent-space representation 347 of the map data 329 in the latent space 333 is ascertained based on the image data 341.

In a further method step 105, a distance D of the latent-space representation 334 of the driving trajectory T1 of the road user 303 to a latent-space representation 335 of at least one normal trajectory T2 in the latent space 333 is ascertained. The normal trajectory T2 describes a normal driving behavior.

In a further method step 107, the driving behavior of the road user 303 is classified as a normal driving behavior if the distance D of the latent-space representation 334 of the driving trajectory T1 of the road user 303 to the latent-space representation 335 of the at least one normal trajectory T2 in the latent space 333 falls below a predetermined limit value (step 106).

On the other hand, in a further method step 109, the driving behavior of the road user 303 is classified as an abnormal driving behavior if the distance D of the latent-space representation 334 of the driving trajectory T1 of the road user 303 to the latent-space representation 335 of the at least one normal trajectory T2 in the latent space 333 exceeds a predetermined limit value (step 106).

In a further method step 111, classification information is output, which describes the respective classification of the driving behavior of the road user 303.

FIG. 7 shows a flow chart of a method 200 for controlling an ego vehicle 301.

According to the present invention, in a first method step 201, a classification of a driving behavior of a further road user located in an environment of the ego vehicle 301 is carried out by carrying out the method 100 according to the present invention for classifying a driving behavior of a road user in the environment of an ego vehicle 301 according to the embodiments described above.

In a further method step 203, the ego vehicle 301 is controlled according to the respective planned trajectory.

For this purpose, a safety maneuver is carried out in a further method step 205 if the driving behavior of the further road user is classified as an abnormal driving behavior.

The safety maneuver may in this case comprise reducing a speed of the ego vehicle 301 and/or increasing a distance of the ego vehicle 301 to the further road user and/or changing a lane, traveled by the ego vehicle, of the traveled roadway. Alternatively or additionally, further maneuvers may be carried out, by means of which a safety of the ego vehicle 301 can be increased and, in particular, a collision with the further road user can be avoided.

Controlling the ego vehicle 301 comprises, in particular, outputting corresponding control signals from the computing unit to actuators of the ego vehicle 301 to carry out the safety maneuver.

FIG. 8 shows a schematic representation of a computer program product 400 comprising instructions that, when the program is executed by a computing unit, cause the latter to carry out the method 100 for classifying a driving behavior of a road user in the environment of an ego vehicle 301 and/or the method 200 for controlling an ego vehicle 301.

The computer program product 400 is stored on a storage medium 401 in the embodiment shown. The storage medium 401 can be any storage medium from the related art.

What is claimed is:

1. A method for classifying a driving behavior of a road user in an environment of an ego vehicle, comprising the following steps:
   receiving trajectory data of a driving trajectory of the road user arranged in the environment of the ego vehicle, wherein the trajectory data include at least position information of the driving trajectory followed by the road user;
   ascertaining a latent-space representation of the driving trajectory of the road user in a latent space, wherein the latent-space representation of the driving trajectory is given by a reduced-dimension representation of the trajectory data;
   ascertaining a distance of the latent-space representation of the driving trajectory of the road user to a latent-space representation of at least one normal trajectory in the latent space, wherein the normal trajectory is classified as a driving trajectory based on a normal driving behavior;
   classifying, by the classification module, whether a driving behavior of the road user is a normal driving behavior or an abnormal driving behavior, according to a condition that the normal driving behavior classification is applied when the distance of the latent-space representation of the driving trajectory of the road user to the latent-space representation of the at least one normal trajectory in the latent space falls below a predetermined limit value, and the abnormal driving behavior classification is applied when the distance of the latent-space representation of the driving trajectory of the road user to the latent-space representation of the at least one normal trajectory in the latent space exceeds the predetermined limit value, wherein the classifying is performed by a classification module that includes an encoder module that is part of a trained autoencoder architecture, the encoder module being configured to generate the latent-space representation of the driving trajectory of the road user and the autoencoder architecture is one that was trained using trajectory data representative of normal driving behavior, such that the classification module is configured to perform the classification based on the training; and
   outputting information based on the classification of the latent-space representation.

2. The method according to claim 1, wherein the distance is determined by a predetermined distance metric, and wherein the distance metric is given by a Euclidean distance function or by a logarithmic likelihood function of the latent-space representations within the latent space.

3. The method according to claim 1, further comprising:
   receiving map data of a map representation mapping the environment of the ego vehicle; and
   ascertaining a latent-space representation of the map data of the map representation in the latent space, wherein the latent-space representation of the driving trajectory is given by a reduced-dimension representation of the map data;
   wherein the ascertaining of the distance and/or the classifying of the driving behavior of the road user takes place taking into account the latent-space representation of the map data of the map representation.

4. The method according to claim 3, further comprising:
   converting the trajectory data into image data of the trajectory data and/or converting the map data into image data of the map data;
   wherein the ascertaining of the distance and/or the classifying the driving behavior of the road user takes place based on the image data of the trajectory data and/or based on the image data of the map data.

5. The method according to claim 1,
   wherein: i) the classification module further includes a connection network,
   wherein the connection network is configured to combine a plurality of image data of the trajectory data and/or a plurality of image data of the map data into input data for the encoder module in vector representation, and/or
   ii) the classification module further includes a map network, wherein the map network is configured to ascertain latent-space representations of the map data based on the image data of the map data; and wherein the connection network and/or the map network are appropriately trained neural networks.

6. The method according to claim 1, wherein the autoencoder architecture is a variational autoencoder (VAE), and wherein the latent-space representations of the driving trajectories are statistical distributions in the latent space and are each characterized by an expected value u and a variance $\sigma^2$.

7. The method according to claim 6, wherein the distributions are Gaussian normal distributions in the latent space.

8. The method according to claim 1, wherein training of the autoencoder architecture is carried out on trajectory data of a plurality of trips of a vehicle or a plurality of vehicles along a roadway traveled by the ego vehicle, and wherein map information of a map representation mapping the respectively traveled roadway and/or information regarding a roadway condition and/or information regarding prevailing traffic regulations and/or information regarding prevailing traffic volumes and/or information regarding prevailing weather conditions and/or time-of-day and/or day-of-the-week information, are also taken into account in the training.

9. The method according to claim 1, wherein:
the normal driving behavior of the road user includes:
driving in a lane, designated according to prevailing traffic regulations, of a traveled roadway, and/or
driving according to prevailing speed regulations, and/or
following a path of the traveled roadway, and/or
driving in a direction of travel designated by prevailing traffic regulations for the traveled roadway and/or lane; and
the abnormal driving behavior includes:
not following the path of the traveled roadway, and/or
driving in a meandering direction of travel deviating from a straight direction of travel, and/or
driving in a direction of travel opposite a direction of travel designated according to the prevailing traffic regulation, and/or
driving at an excessive speed, and/or
driving in a lane not designated according to the prevailing traffic regulations.

10. A method for controlling an ego vehicle, comprising the following steps:
carrying out a classification of a driving behavior of a road user in an environment of the ego vehicle based on trajectory data of a driving trajectory of the road user, the carrying out of the classification including:
receiving the trajectory data of the driving trajectory of the road user arranged in the environment of the ego vehicle, wherein the trajectory data include at least position information of the driving trajectory followed by the road user;
ascertaining a latent-space representation of the driving trajectory of the road user in a latent space, wherein the latent-space representation of the driving trajectory is given by a reduced-dimension representation of the trajectory data;
ascertaining a distance of the latent-space representation of the driving trajectory of the road user to a latent-space representation of at least one normal trajectory in the latent space, wherein the normal trajectory is classified as a driving trajectory based on a normal driving behavior;
classifying, by the classification module, whether a driving behavior of the road user is a normal driving behavior or an abnormal driving behavior, according to a condition that the normal driving behavior classification is applied when the distance of the latent-space representation of the driving trajectory of the road user to the latent-space representation of the at least one normal trajectory in the latent space falls below a predetermined limit value, and the abnormal driving behavior classification is applied when the distance of the latent-space representation of the driving trajectory of the road user to the latent-space representation of the at least one normal trajectory in the latent space exceeds the predetermined limit value, wherein the classifying is performed by a classification module that includes an encoder module that is part of a trained autoencoder architecture, the encoder module being configured to generate the latent-space representation of the driving trajectory of the road user and the autoencoder architecture is one that was trained using trajectory data representative of normal driving behavior, such that the classification module is configured to perform the classification based on the training; and
controlling the ego vehicle based on the classification of the driving behavior of the road user.

11. The method according to claim 10, wherein the controlling of the ego vehicle includes:
carrying out a safety maneuver when the driving behavior of the road user is classified as an abnormal driving behavior.

12. The method according to claim 11, wherein the safety maneuver includes:
reducing a speed of the ego vehicle; and/or
increasing a distance of the ego vehicle to the road user; and/or
changing a lane, traveled by the ego vehicle, of the traveled roadway.

13. A computing unit comprising a processor system that includes at least one processor that is programmed to:
receive trajectory data of a driving trajectory of a road user arranged in an environment of an ego vehicle, wherein the trajectory data include at least position information of the driving trajectory followed by the road user;
ascertain a latent-space representation of the driving trajectory of the road user in a latent space, wherein the latent-space representation of the driving trajectory is given by a reduced-dimension representation of the trajectory data;
ascertain a distance of the latent-space representation of the driving trajectory of the road user to a latent-space representation of at least one normal trajectory in the latent space, wherein the normal trajectory is classified as a driving trajectory based on a normal driving behavior;
classify, by a classification module, whether a driving behavior of the road user is a normal driving behavior or an abnormal driving behavior, according to a condition that the normal driving behavior classification is applied when the distance of the latent-space representation of the driving trajectory of the road user to the latent-space representation of the at least one normal trajectory in the latent space falls below a predetermined limit value, and the abnormal driving behavior classification is applied when the distance of the latent-space representation of the driving trajectory of the road user to the latent-space representation of the at least one normal trajectory in the latent space exceeds the predetermined limit value, wherein the classifying is performed by a classification module that includes an encoder module that is part of a trained autoencoder architecture, the encoder module being configured to generate the latent-space representation of the driving trajectory of the road user and the autoencoder architecture is one that was trained using trajectory data representative of normal driving behavior, such that the classification module is configured to perform the classification based on the training; and output information based on the classification of the latent-space representation.

14. The computing unit according to claim 13, wherein the computing unit is further configured to:

control the ego vehicle, taking into account the classification of the driving behavior of the road user.

15. A non-transitory computer-readable storage medium on which is stored a computer program including instructions for classifying a driving behavior of a road user in an environment of an ego vehicle, the instructions, when executed by a computer, causing the computer to perform the following steps:

receiving trajectory data of a driving trajectory of the road user arranged in the environment of the ego vehicle, wherein the trajectory data include at least position information of the driving trajectory followed by the road user;

ascertaining a latent-space representation of the driving trajectory of the road user in a latent space, wherein the latent-space representation of the driving trajectory is given by a reduced-dimension representation of the trajectory data;

ascertaining a distance of the latent-space representation of the driving trajectory of the road user to a latent-space representation of at least one normal trajectory in the latent space, wherein the normal trajectory is classified as a driving trajectory based on a normal driving behavior;

classifying, by the classification module, whether a driving behavior of the road user is a normal driving behavior or an abnormal driving behavior, according to a condition that the normal driving behavior classification is applied when the distance of the latent-space representation of the driving trajectory of the road user to the latent-space representation of the at least one normal trajectory in the latent space falls below a predetermined limit value, and the abnormal driving behavior classification is applied when the distance of the latent-space representation of the driving trajectory of the road user to the latent-space representation of the at least one normal trajectory in the latent space exceeds the predetermined limit value, wherein the classifying is performed by a classification module that includes an encoder module that is part of a trained autoencoder architecture, the encoder module being configured to generate the latent-space representation of the driving trajectory of the road user and the autoencoder architecture is one that was trained using trajectory data representative of normal driving behavior, such that the classification module is configured to perform the classification based on the training; and outputting information based on the classification of the latent-space representation.

* * * * *